US007007050B2

(12) United States Patent
Saarinen

(10) Patent No.: US 7,007,050 B2
(45) Date of Patent: Feb. 28, 2006

(54) METHOD AND APPARATUS FOR IMPROVED PSEUDO-RANDOM NUMBER GENERATION

(75) Inventor: Markku-Juhani Saarinen, Helsinki (FI)

(73) Assignee: Nokia Corporation, Espoo (FI)

( * ) Notice: Subject to any disclaimer, the term of this patent is extended or adjusted under 35 U.S.C. 154(b) by 888 days.

(21) Appl. No.: 09/859,274

(22) Filed: May 17, 2001

(65) Prior Publication Data

US 2002/0172359 A1 Nov. 21, 2002

(51) Int. Cl.
G06F 7/58 (2006.01)
(52) U.S. Cl. ...................... 708/250; 708/254; 708/255; 380/44; 380/46
(58) Field of Classification Search ........ 708/250–256; 380/2, 44, 46, 28
See application file for complete search history.

(56) References Cited

U.S. PATENT DOCUMENTS

| | | | | |
|---|---|---|---|---|
| 5,297,207 | A | 3/1994 | Degele | 380/46 |
| 5,541,996 | A * | 7/1996 | Ridenour | 380/46 |
| 5,724,428 | A * | 3/1998 | Rivest | 380/37 |
| 5,732,138 | A | 3/1998 | Noll et al. | 380/28 |
| 5,983,252 | A | 11/1999 | Clapp | 708/250 |
| 6,044,388 | A | 3/2000 | DeBellis et al. | 708/254 |
| 6,069,954 | A | 5/2000 | Moreau | 380/28 |

OTHER PUBLICATIONS

Carl Ellison, "Cryptographic Random Numbers", 1995 http://world.std.com/~cme/P1363/ranno.html.*
Jon Callas, "Using and Creating Cryptographic-Quality Random Numbers", Jun. 3, 1996. http://www.merrymeet.com/jon/usingrandom.html.*
Tim Matthews, "An RSA Data Security Engineering Report", Dec. 15, 1995. http://www.anujseth.com/crypto/random_rsa_report.php.*
Crocker et al., "Randomness Recommendations for Security", Network Working Group, Dec. 1994. http://www.ietf.org/rfc/rfc1750.txt.*
PCT International Search Report, International Application No. PCT/IB02/01649, Date of Completion of Search—Sep. 6, 2002, Sheets 1, 1(2) and 2.

* cited by examiner

Primary Examiner—Gregory Morse
Assistant Examiner—Tongoc Tran
(74) Attorney, Agent, or Firm—Morgan & Finnegan, LLP

(57) ABSTRACT

A pseudo-random number generator (PRNG) for a cryptographic processing system is disclosed in which the PRNG is reseeded at each instance of input entropy and in which a standard timestamp variable used in determining random sequence outputs is replaced with a running counter. The method employed by the PRNG demonstrates increased resistance to iterative-guessing attacks and chosen-input attacks than those of previous technologies. The PRNG is suitable for use in, for example, a mobile telephone system for accomplishing secure communications.

68 Claims, 6 Drawing Sheets

METHOD AND APPARATUS FOR IMPROVED PSEUDO-RANDOM NUMBER GENERATION

FIELD OF THE INVENTION

The present invention is directed generally to cryptography, and more particularly to pseudo-random number sequencing.

BACKGROUND OF THE INVENTION

Pseudo-random number generators (PRNGs) are used in a wide variety of cryptographic applications. In particular, random outputs of PRNGs are relied upon in generating, for example, (1) unpredictable session identifiers or cookies for online client-server sessions, (2) key generation for symmetric, asymmetric encryption, the Diffie-Hellman key exchange algorithm and digital signature algorithms (DSA), (3) generating nonces in challenge-response authentication mechanisms, (4) producing random padding in cryptographic padding mechanisms such as public key cryptosystems (PKCS-1) and (5) providing random variables for accomplishing secure transmissions via wireless transport layer security (WTLS) and wireless application protocols (WAPs).

Common PRNGs are based on the American National Standards Institute (ANSI) X9.17 standard and are typically used with the Digital Encryption Standard (DES) or 3-DES block ciphers. Other block ciphers, such as Rivest Cipher-5 (RC-5) may also be used. In order to accomplish secure communications, it is desireable that the outputs from the PRNG be unpredictable. If the output of a PRNG becomes predictable, it will, in turn become easier to decipher any communications from a cryptography system employing such a PRNG. Thus, the random nature of a PRNG is an important aspect in maintaining secure communications.

Recently, several studies have determined that PRNGs using the ANSI X9.17 standard may be vulnerable to certain cryptographic attacks. In particular, it has been discovered that if the internal key used by an ANSI X9.17 PRNG becomes known, the PRNG becomes vulnerable to permanent compromise attacks. If an attacker can force input seed values to an ANSI X9.17 PRNG in an adaptive attack, it may be possible to force the PRNG to generate outputs in a partially-predictable manner. In addition, if an internal state of an ANSI X9.17 PRNG becomes known, a backtracking attack may be performed to discover previous secret outputs of the PRNG. See, e.g., Kelsey, J., et al., "Cryptanalytic Attacks on Pseudo-Random Number Generators," ESORICS '98 Proceedings, Springer-Verlag, 1998, pp. 77–110 and Kelsey, J. et al., "Yarrow-160: Notes and the Design and Analysis of the Yarrow Cryptographic Pseudo-random Number Generator," Proceedings of the Sixth Annual Workshop on Selected Areas in Cryptography.

Various methods for random number generation have been previously disclosed. See, for example, U.S. Pat. Nos. 6,141,668; 6,065,029; 6,061,703; 6,044,388; 5,983,252; 5,966,313; 5,961,577; 5,872,725; 5,864,491; 5,828,752; and 5,046,036. However, none of these systems provide a sufficient solution to the possible attacks noted above. Accordingly, there is a need for a method and apparatus for pseudo-random number generation which addresses certain deficiencies in prior technologies.

SUMMARY OF THE INVENTION

According to certain embodiments of the present invention, a method and apparatus for seeding a PRNG is presented in which a plurality of state variables in an output buffer for use by the PRNG in determining a random number. The PRNG receives successive input entropy signals. The output buffer is cleared upon receipt of each of the successive input entropy signals and new state variables are calculated thereafter.

In a further embodiment of the present invention, a method and apparatus for seeding a PRNG in an initial state is provided for securely generating a random number. In this embodiment, an input seed is received. New state variables are then calculated by concatenating the input seed with a first constant, determining a first output based on a hash of the concatenated input seed and the first constant, concatenating the input seed with a second constant and determining a second output based on a hash of the concatenated input seed and the second constant. A key for generating a random number is then determined based on at least a portion of the first output. A counter variable for generating a random number is determined based on a portion of the second output. The key and the counter variable are then stored in an output buffer.

According to another embodiment of the present invention, a method and apparatus for generating state variables for a PRNG, after an initial state, is provided for securely generating a random number. In such an embodiment, first state variables are stored in an output buffer. The first state variable include a first key, a first seed value and a first counter variable. A new input seed is the received. The output buffer is then cleared in response to the new input seed. Second state variables are then determined based on the new input seed and the first state variables.

According to still another embodiment of the present invention, a method and apparatus for determining a random number using a PRNG in an initial state are provided in which state variables for the PRNG are stored in an output buffer, the state variables include a first key, a first seed value, and a first counter variable. A second counter variable is determined by summing the first counter variable with a constant. The second counter variable is then encrypted using the first key and a block cipher to generate a first encrypted result. The first encrypted result is concatenated with the first seed value to generate a second encrypted result. The second encrypted result is the encrypted using the first key and the block cipher to generate a random number.

According to still another embodiment of the present invention, a method and apparatus for generating a random number is provided in which a key and a counter variable are stored in an output buffer. The counter variable is not a timestamp variable relating to a particular time. A first random number is the generated based on at least the key and the counter variable.

According to a further embodiment of the present invention, a method and apparatus for determining a sequential output of random numbers using a PRNG in an initial state is provided. Initial state variables are stored in an output buffer. The initial state variables include a first key, a first seed value, and a first counter variable Prior to receiving further input seed, a second counter variable is determined by summing the first counter variable with a constant. The second counter variable is encrypted using the first key and a block cipher to generate a first encrypted result. The first encrypted result is then concatenated with the first seed value to generate a second encrypted result. The second encrypted result is then encrypted using the first key and the block cipher to generate a random number. A second seed value may then be determined by: (1) encrypting the second counter variable using the key and the block cipher to generate a third encrypted result; (2) performing an exclusive-or operation of the third encrypted result with the random number to determine a fourth encrypted result; and (3) encrypting the fourth encrypted result using the key and the block cipher to determine the second seed value for generating a subsequent random number. A third counter variable is then determined by (1) summing the second counter variable with the constant, (2) encrypting the third counter variable using the key and the block cipher to generate a fifth encrypted result, (3) XOR-ing the fifth encrypted result with the second seed value to generate a sixth encrypted result, and (4) encrypting the sixth encrypted result using the first key and the block cipher to generate a second random number.

It is an advantage of the present invention, therefore, to have a method and apparatus for seeding a PRNG and determining random numbers using a counter variable in place of a timestamp variable in order to improve the security of PRNGs in a cryptographic system.

It is a further advantage of the present invention to implement the PRNG associated with the invention in either hardware or software, or in a combination of both hardware and software.

It is another advantage of the present invention to implement the inventive method of seeding and determining random numbers by using small amounts of random access memory (RAM) and Read-Only Memory (ROM) so that the invention may be embodied in mobile terminal, such as wireless cellular, satellite telephones and other wireless devices capable of two-way wireless communications, e.g. personal digital assistants (PDA's).

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

The invention relates to a system and method for securing a PRNG against crypto-analytic attacks by which outputs from the PRNG may be guessed or determined. The PRNG may be enabled in hardware or software and may be employed by a mobile device, such as a mobile telephone using WAP/WTLS. The contemplated security features include: (1) reseeding the PRNG at each instance of input entropy in order to change the internal state of the PRNG, thereby generating a new internal key for each new seed input, and (2) replacing a timestamp variable with a running counter, the value of which is less likely to be known or determined outside the system. Specifically, input seeds are provided in sufficiently large increments to avoid iterative-guessing attacks. Upon the input of a new seed to the PRNG, two hash functions (employing either Secure Hash Algorithm-1 (SHA-1) or Message Digest-5 (MD5)) are used to generate a new internal key, a new seed variable and a new counter variable. These two hash functions each operate on the concatenation of a chosen constant value in base 16, the current internal key K, the current seed value S, the current counter variable T and an input seed comprising a byte array of arbitrary length. The constant values chosen for each of the two hash functions may not be the same.

The results of these hash functions are then used in the following manner. The first 128-bit segment of the results of the first hash function are used to generate the next internal key. The first 64-bit segment of the results of the second hash function are used to generate a new seed value. The second 64-bit segment of the results of the second hash function are used to generate a new counter variable. A random number $O_i$ is generated from the results of encrypting the current counter variable and the previous seed value, according to a block cipher. The block cipher may be RC-5, although other block ciphers may also be used. Other available block ciphers include the Data Encryption Standard (DES), IDEA, Blowfish, CAST-n, MISTY, SKIPJACK and KASUMI. With come adjustments, the following block ciphers may likewise be used with the processes herein: Rivest Cipher 6 (RC-6), triple Data Encryption Satndard (3-DES), Advanced Encryption Standard (AES), and Twofish. Methods for encrypting using RC-5 are disclosed in U.S. Pat. Nos. 5,835,600 and 5,724,428, each being incorporated herein by reference. The output segments are received in an output buffer, which is purged upon the input of a new seed to the PRNG.

Referring now to FIGS. 1–6B, wherein similar components of the present invention are referenced in like manner, preferred embodiments of a method and apparatus for improved pseudo-random number generation are disclosed.

Figure 1:
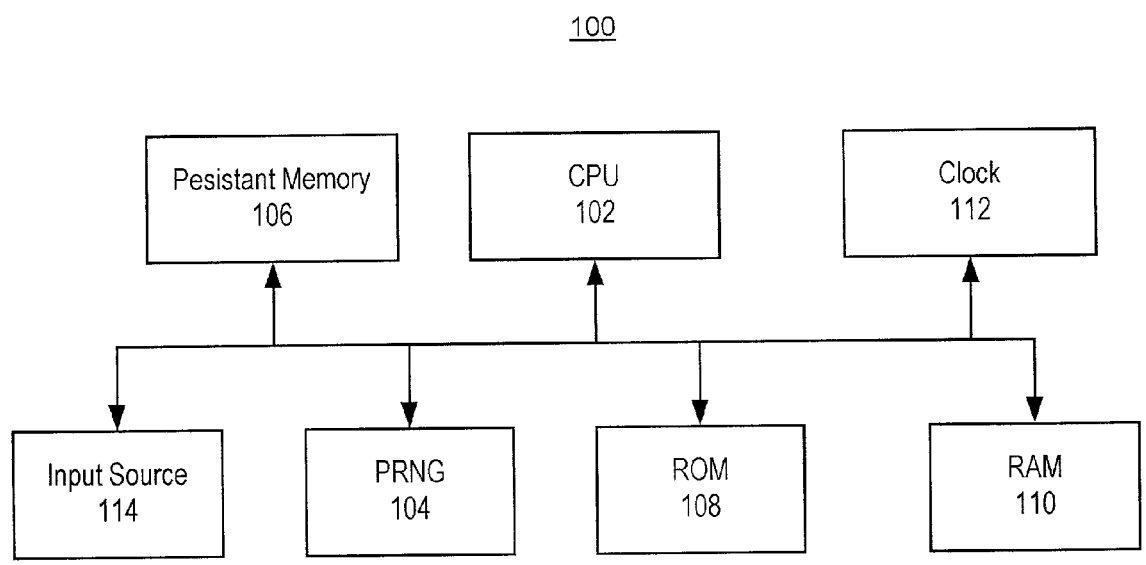
FIG. 1 is a block diagram of a system employing a pseudo-random number generator implemented by hardware.

FIG. 1 discloses a cryptographic system 100 implemented in hardware and suitable for use with the present invention. The system 100 includes a central processing unit (CPU) 102, a PRNG 104, a persistent memory store 106, ROM 108, RAM 110, a clock 112, and an entropy input source 114. These elements of system 100 may communicate over a common data bus or in any other equivalent manner.

The CPU 102 may be any available cryptographic processor capable of handling, for example, 128-bit encryption processes. It is contemplated that CPU 102 may be an ARM-7 CPU core manufactured by ARM, INC. However, other processing systems may likewise be used.

The PRNG 104 may be a physical PRNG by which input entropy signals are received and a string of random bits are generated and output. Such physical PRNG hardware is commonly available and known to one of ordinary skill in the art. Alternatively, the PRNG may be software code stored in a persistent memory 106 of the system 100. The PRNG software may be implemented, for example, using ANSI-C programming code or JAVA programming languages to emulate a physical PRNG.

The persistent memory store 106 may be any memory device, such as semi-conductor memory device for storing binary instructions and data. The persistent memory store may be a CMOS storage device, or any other device in which such binary instructions and data may be maintained in the absence of power. Preferably, the persistent memory store 106 is suitable for operation with mobile terminals. The persistent memory store 106 may act as an output buffer for state variables and random numbers used by the system 100.

ROM 108 may be any memory device, such as an electronically eraseable and programmable read-only memory (EEPROM) device suitable for providing processing instructions upon power-up of the system 100.

RAM 110 may be any memory device, such as a Single In-Line Memory Module (SIMM) chip capable of temporary, power-dependent storage for storing processing instructions and data during operation of the system 100.

Clock 112 may be any device for providing clocking signals to synchronize the communication between the elements of system 100.

Input source 114 may be any device capable of providing input entropy signals to the PRNG 104. Accordingly, the input source 114 may detect system events, capture noise signals from a microphone or particular radio frequencies, generate or receive random bits from other devices or components, or retrieve random data from memory allocation tables stored in persistent memory store 106. The input source 114 may then transmit the input entropy signals received in any of these manners to the PRNG as an input seed.

Alternatively, the input entropy signals may be accumulated in an entropy accumulation pool as may be stored in persistent memory store 106. When a predetermined amount of entropy signals are stored in such pool, the accumulated signals may then be provided to the PRNG 104. Such process for providing accumulated signals is described further below in conjunction with FIG. 5B. The input entropy signals or accumulated entropy signals may be transmitted to the PRNG 104 at random or predetermined intervals in order to re-seed the PRNG. Such re-seeding is discussed further below in conjunction with FIG. 5A.

The system 100 is contemplated to be implemented within a mobile terminal, such as cellular telephone model nos. 6210, 6250, 7160 and 7190 manufactured by NOKIA CORPORATION.

Figure 2:
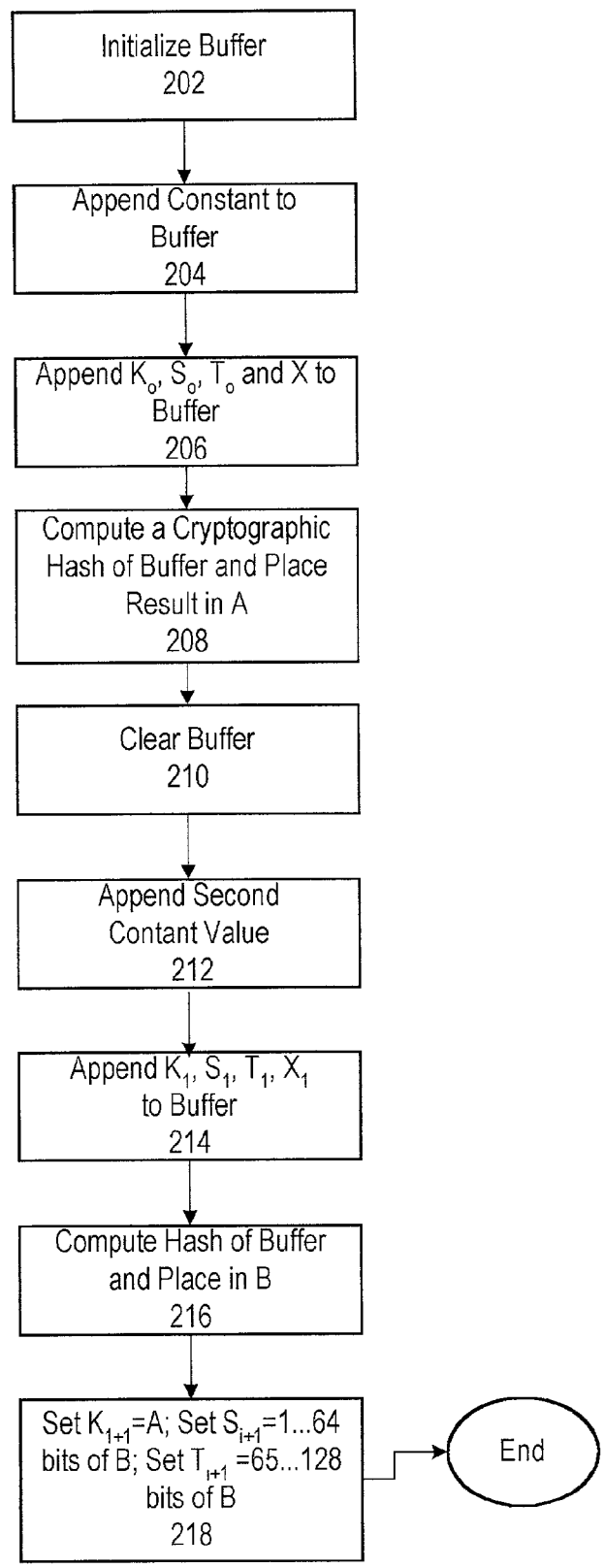
FIG. 2 is a flow chart depicting an exemplary re-seeding process for initializing a PRNG implemented in hardware or software.

Referring now to FIG. 2, therein is depicted an exemplary re-seeding process 200 for initializing a PRNG implemented in hardware and/or software. The process 200 begins by initializing an output buffer, such as persistent memory store 106, to store state variable for the PRNG 104 (step 102). A first constant C1 is then appended to the output buffer (step 204). The constant C1 may be, for example, $5555AAAA_{16}$, as a binary number expressed in base-16.

State variables representing a first key $K_o$, a first seed value $S_o$, a first counter variable $T_o$ and an input seed X may be appended to the output buffer (step 206). The state variables may each be set to be zero in an initial state of the PRNG. Methods for determining such state variables are described further below with respect to FIG. 3. The input seed X may be a byte array of arbitrary length which may be generated by input source 114.

The CPU 102 may then perform a cryptographic hash of the values in the buffer and may store the results as a first output A (step 208) in RAM 110. The hash may be a function such as a Secure Hash algorithm-1 (SHA-1) or a Message Digest-5 (MD-5) algorithm.

The output buffer may then be cleared upon receipt of new input seed $X_1$ (step 210). A second constant C2 may then be appended to the output buffer (step 212). The constant C2 may be, for example, $AAAA5555_{16}$, a binary number expressed in base-16.

New state variables may then be appended to the output buffer, including a second key $K_1$, a first seed value $S_1$, a first counter variable $T_1$ and the input seed $X_1$ (step 214). The state variables may each be set to be zero in an initial state of the PRNG. Methods for determining such state variables are described further below with respect to FIG. 3. The input seed $X_1$ may be a byte array of arbitrary length which may be generated by input source 114.

The CPU 102 may then perform a cryptographic hash of the values in the buffer and may store the results as a first output A (step 216) in RAM 110. The hash may be a function such as SHA-1 or MD-5.

A new key K may then be determined as the value of output A. The new seed value S may be determined as a portion of output B. The new counter variable T may be a second portion of output B (step 218). These new state variables may then be stored for use by the PRNG 104, after which process 200 ends.

It is preferable that process 200 is performed upon each new receipt of input entropy from the input source 114.

In mathematical terms, the above process 200 may be expressed as follows:

Let $K_1$=a 128-bit key used by a block cipher;
Let $T_1$=a 64-bit counter variable;
Let $S_1$=a 64-bit chaining variable or seed value;
Let $X_1$=an input seed of arbitrary length;
Let H(x) denote an SHA-1 or MD-5 hash of x,
Let x∥y denote a concatentation of two byte strings x and y.
Let C1 and C2 be constants (e.g. $5555AAAA_{16}$ and $AAAA5555_{16}$, respectively)

Then output variables A and B may be determined as follows:

A=H(C1∥$K_1$∥$S_1$∥$T_1$∥$X_1$)
B=H(C2 ∥$K_1$∥$S_1$∥$T_1$∥$X_i$)

It is contemplated that A and B may be determined as 128 bit strings. In such a case, a new key K will be determined as the entire 128 bit string of A. A new seed value S may be determined as the first 64 bits of B (i.e. bits 1.0.64) and the new counter variable T may be determined as the second 64 bits of B (i.e. bits 65 . . . 18 of B).

Figure 3:
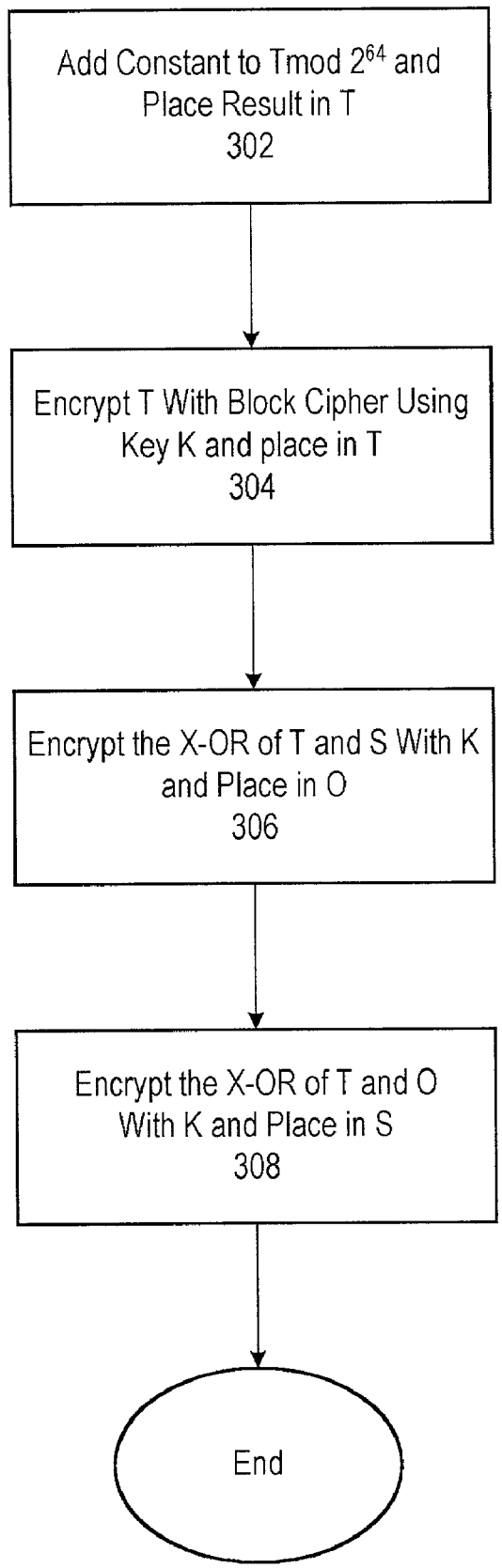
FIG. 3 is a flow chart depicting an exemplary random number generation process for providing a random output in accordance with certain embodiments of the present invention.

FIG. 3 is a flow chart depicting an exemplary random number generation process 300 for generating a random number O without new input seed in accordance with certain embodiments of the present invention. The process 300 begins by adding a constant C to the current counter variable T and place the result in the output buffer (step 302). The constant C may be a 64-bit odd constant, such as $2^{64}$log2 or $B17217F7D1CF79AB_{16}$. The addition of T and C may be performed in little endian fashion modulo $2^{64}$.

The counter variable T is then encrypted with a block cipher using key K and stored as a first encrypted result (step 304). An exclusive-OR (XOR) operation is then performed on the first encrypted result and a previous seed value S. The result of the XOR operation is then encrypted using the block cipher and the current key K (step 306). The resulting value is the generated random number O. The first encrypted result from step 304 is then XOR-ed with the random number O and the result is encrypted to generate a current seed value S (step 308), after which process 300 ends. The current seed value S may then be used to generate subsequent random numbers.

In mathematical terms, the process 300 may be expressed as follows:

Let C=a 64-bit odd constant;
Let $O_i$=a 64-bit random number;
Let $K_1$=a 128-bit key used by a block cipher;
Let $T_1$=a 64-bit counter variable;
Let $S_1$=a 64-bit chaining variable or seed value;
Let x (+) y denote an XOR operation between byte strings x and y;
Let x [+] y denote the modulo $2^n$ sum of x and y;
Let $E_k(x)$ denote the encryption of x with key K using a block cipher. (It is preferred that the block cipher uses a 64-bit block size in 16 rounds with a 128-bit key.)

State variables and pseudo-random numbers then may be generated as follows:

$T_1 = T_{i-1}[+]C$
$O_1 = E_k(E_k(T_1)(+) S_{i-1})$
$S_1 = E_k(E_k(T_1)(+) O_i)$

Figure 4:
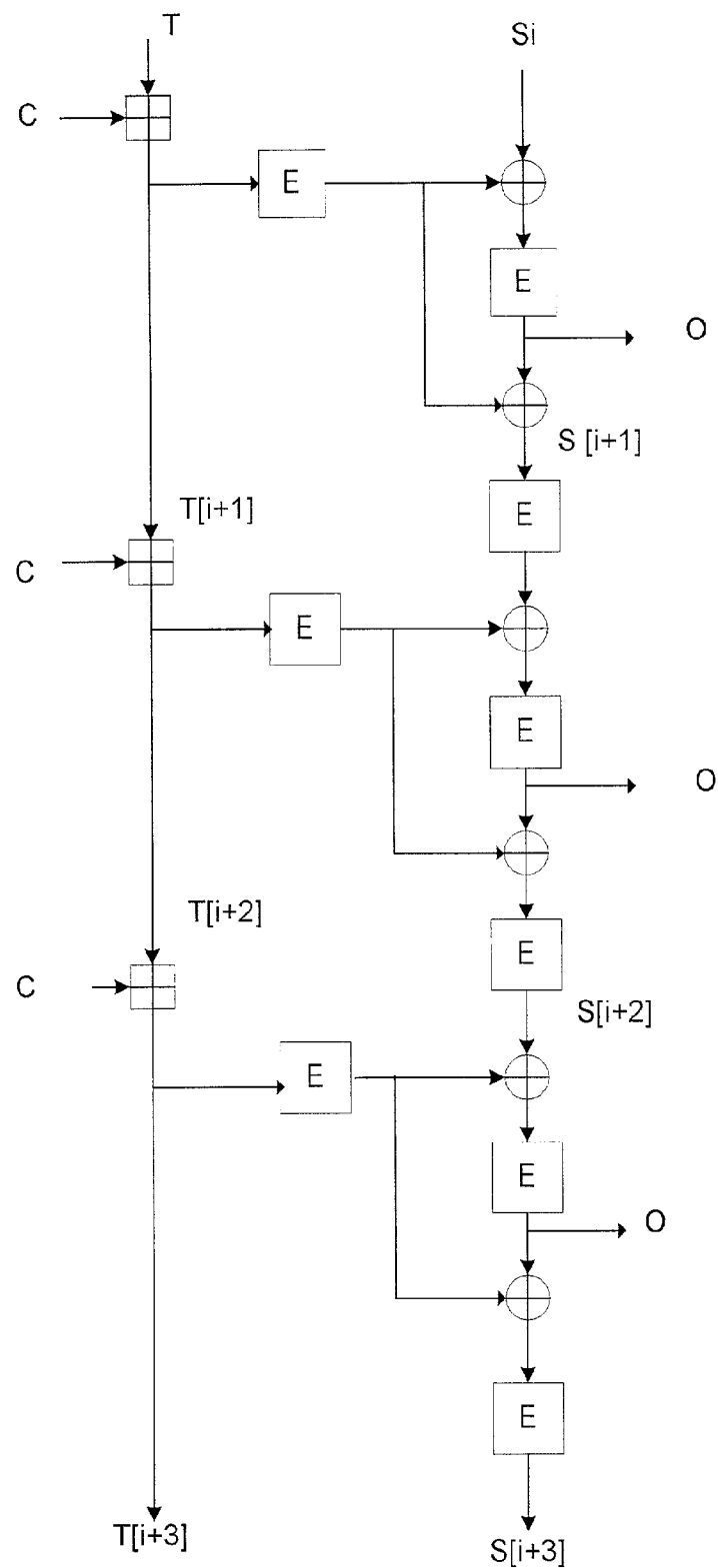
FIG. 4 is a flow chart depicting an exemplary random number generation process for providing a random output in a series of rounds in accordance with certain embodiments of the present invention.

FIG. 4 is a flow chart depicting an exemplary random number generation process for providing a random output in a series of rounds (3 rounds as shown) in accordance with certain embodiments of the present invention. As shown therein, T represents the counter variable, C represent a constant, E represents an encryption function, S represents a seed value, O represents a random number, [+] represent a modulo $2^n$ sum and (+) represents and XOR operation.

Figure 5A:
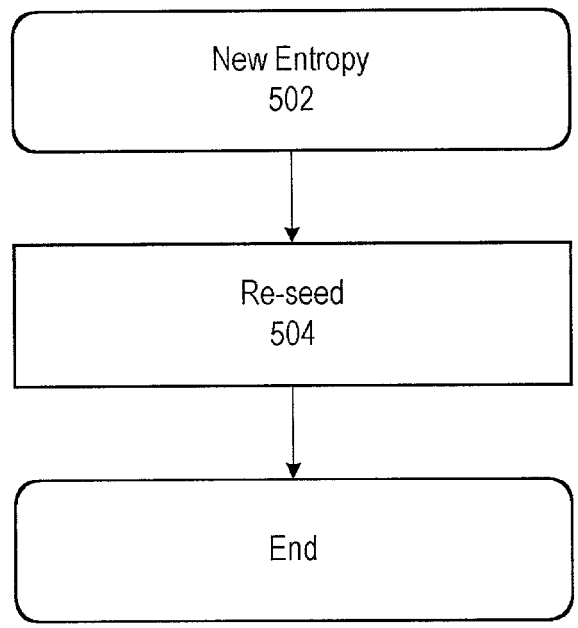
FIGS. 5A–5B are flow charts depicting exemplary processes for initiating re-seeding of a PRNG in accordance with certain embodiments of the present invention.
Figure 5B:
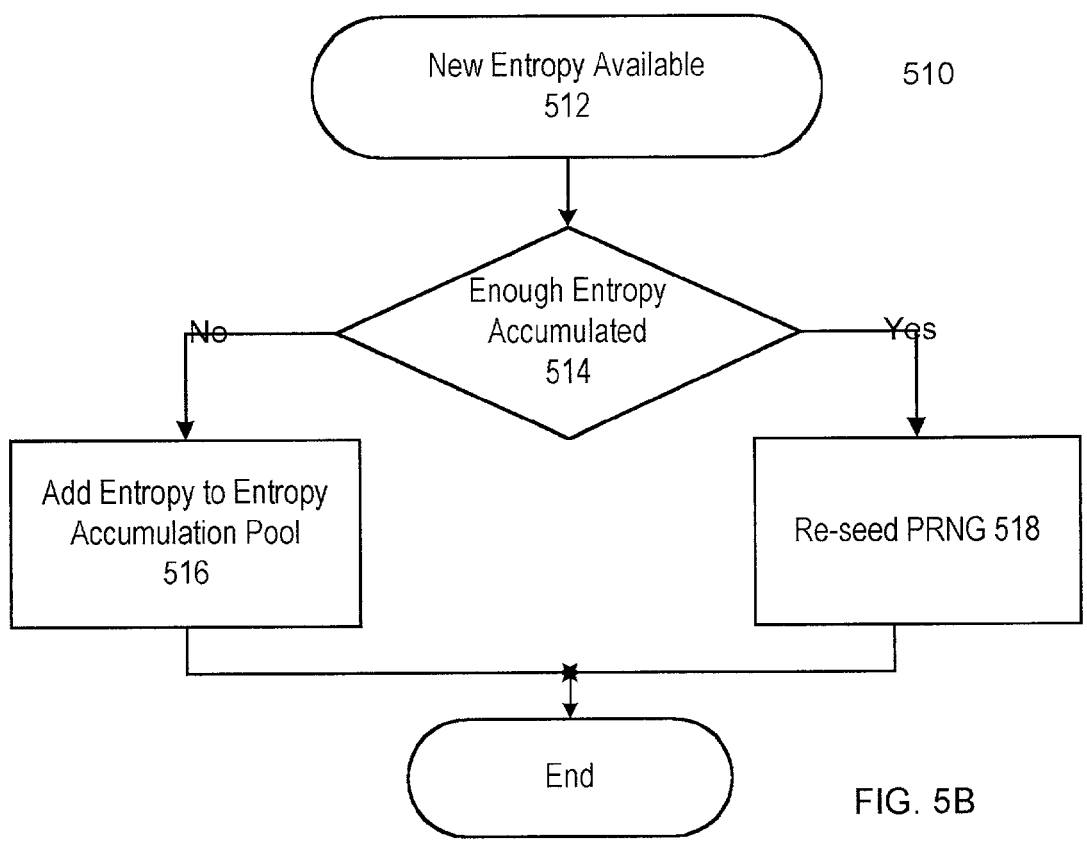

FIGS. 5A–5B are flow charts depicting exemplary processes 500 and 510, respectively, for initiating re-seeding of a PRNG 104 in accordance with certain embodiments of the present invention. Referring to FIG. 5A, a process 500 for re-seeding upon each instance of new input entropy is shown. The process 500 begins upon receipt of a new entropy signal from input entropy source 114 (step 502). The PRNG is re-seeded by generating new state variables (step 504) as described above with respect to FIG. 2. The process 500 then ends.

FIG. 5B depicts an exemplary process 510 for determining when to transmit new input entropy to the PRNG 104 when entropy signals are accumulated. The process 510 begins at step 512 when the CPU 102 determines whether new input entropy is available. This may be done by searching an input entropy accumulation pool stored in persistent memory store 106. If there is no sufficient accumulation of input entropy (i.e. if a predetermined value of input entropy has not been stored), the process 510 continues to step 516 where entropy is further accumulated in the entropy pool. If, on the other hand, sufficient input entropy has been stored, the process 510 continues to step 518 where the PRNG 104 is re-seeded, where newly determined state variables are based at least in part on the accumulated input entropy signals. The process 510 then ends.

Figure 6A:
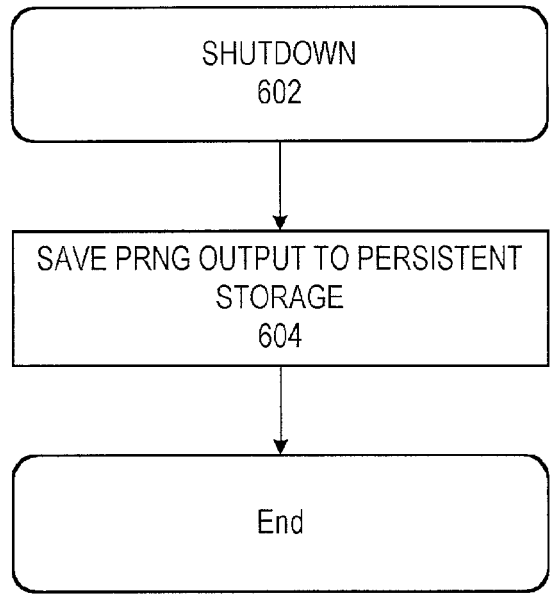
FIGS. 6A–6B are flow charts depicting exemplary processes for storing and retrieving PRNG state information from persistent storage in accordance with certain embodiments of the present invention.
Figure 6B:
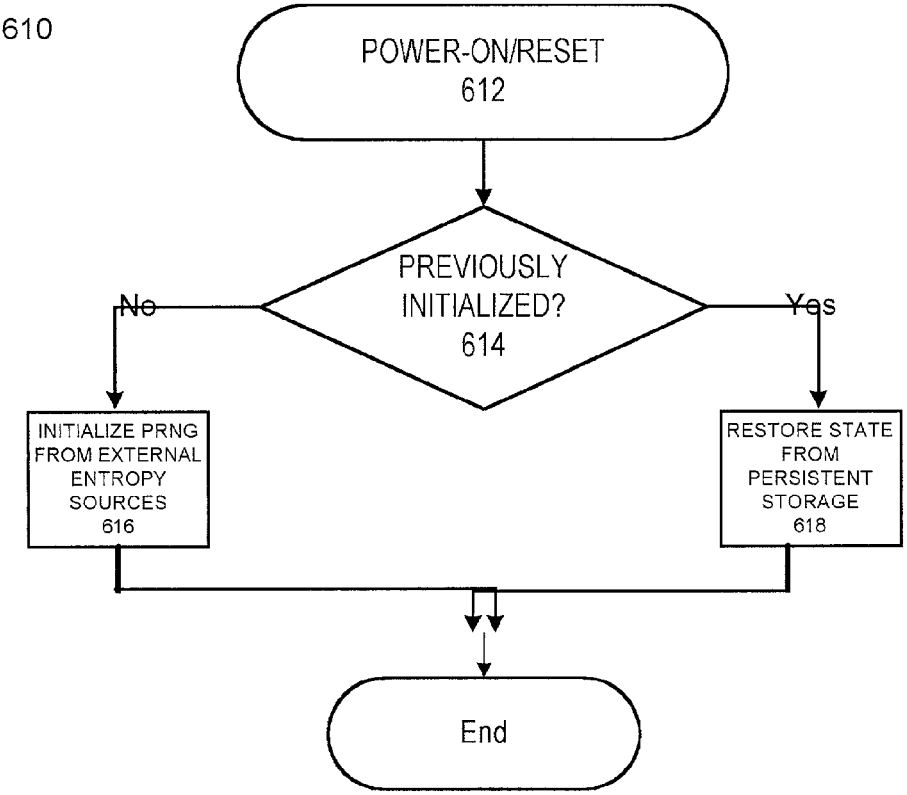

FIGS. 6A–6B are flow charts depicting exemplary processes for storing and retrieving PRNG state information from persistent storage in accordance with certain embodiments of the present invention.

FIG. 6A depicts an exemplary shutdown process 600 which may be performed by system 100. When a shutdown of system 100 is detected (step 602), the CPU 102 may direct the storage in PRNG state variables in persistent memory store 106 (step 604), after which process 600 ends.

FIG. 6B depicts an exemplary power-up process 610 for the system 100. Upon detection of a power-up condition (step 612), the CPU 102 determines whether the PRNG has been previously initialized (step 614), e.g. if previous state variables are stored in persistent memory store 106. If so, the process 610 continues to step 618 where the previous state variables are retrieved from persistent memory store 106 for use by the PRNG 104 in generating new random numbers. If no previous state variables are stored, the process continues to step 616 where new state variables are generated based on input entropy signals from input source 114, in accordance with process 200 above. The process 610 then ends.

The PRNG 104 as described herein may be bijective, e.g. it may be run backwards or forward in between seeding operations. The counter variable T, described above, does not include a timestamp value, i.e. denoting a particular time and/or date, which may be learned or guessed by an attacker by noting the particular time. Rather, the counter variable is a random variable that may be incremented by a constant between re-seeding processes. The counter variable may further be determined based on received input entropy upon re-seeding of the PRNG 104. The use of the counter variable, therefore, increases the security of the cryptographic system 100 in a manner not contemplated in previous technologies.

Although the invention has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A method for seeding a pseudo-random number generator (PRNG), comprising:
    storing a plurality of state variables including an internal key, a seed value and a counter variable based on a hash output in an output buffer for use by a PRNG in determining a random number;
    receiving successive input entropy signals;
    clearing the output buffer upon receipt of each of said successive input entropy signals; and
    calculating new state variables after receipt of each of said successive input entropy signals, wherein each of said successive input entropy signals comprise an input seed and said state variables comprise at least one constant expressed as a binary number, said calculating, in an initial state of the PRNG, further comprises:
    receiving the input seed;
    concatenating the input seed with a first constant;
    determining a first output based on a hash of the concatenated input seed and the first constant;
    concatenating the input seed with a second constant;
    determining a second output based on a hash of the concatenated input seed and the second constant;
    determining a key based on at least a portion of the first output, the key for determining a random number; and
    determining a counter variable based on a portion of the second output, the counter variable for determining a random number.

2. The method of claim 1 further comprising:
    storing said new state variables in a persistent memory after said calculating.

3. The method of claim 1 wherein said successive input entropy signals are each provided after an accumulation of input entropy.

4. The method of claim 1, wherein said successive input entropy signals are each provided at predetermined intervals.

5. The method of claim 1, wherein said successive input entropy signals are each provided at random intervals.

6. The method of claim 1, wherein said hash comprises at least one of: a Secure Hash Algorithm-1 (SHA-1) and a Message Digest-5 (MD-5) algorithm.

7. The method of claim 1, wherein said calculating, after an initial state in a PRNG, further comprises:
concatenating a first constant, the key, the seed value, the counter variable and the input seed to determine a first result;
performing a hash of the first result to determine a first output value;
concatenating a second constant, the first key, the first seed value, the first counter variable and the input seed to determine a second result;
performing a hash of the second result to determine a second output value;
determining a second key based on the first output value;
determining a second seed value based on at least a first portion of the second output value; and
determining a second counter variable based on at least a second portion of the second output value.

8. The method of claim 7, wherein said hash comprises at least one of: a Secure Hash Algorithm-1 (SHA-1) and a Message Digest-5 (MD-5) algorithm.

9. The method of claim 1, wherein said counter variable does not comprise a timestamp value.

10. The method of claim 1, further comprising:
generating a plurality of random numbers using said state variables between a receipt of successive input entropy signals.

11. A mobile terminal comprising instructions for performing the method of claim 1.

12. A method for seeding a pseudo-random number generator (PRNG) in an initial state for securely generating a random number, comprising:
receiving an input seed;
concatenating the input seed with a first constant;
determining a first output based on a hash of the concatenated input seed and the first constant;
concatenating the input seed with a second constant;
determining a second output based on a hash of the concatenated input seed and the second constant;
determining a key based on at least a portion of the first output, the key for determining a random number;
determining a counter variable based on a portion of the second output, the counter variable for determining a random number; and
storing the key and the counter variable in an output buffer.

13. The method of claim 12, wherein the input seed comprises an arbitrary byte array received from an entropy source.

14. The method of claim 12, wherein said hash comprises a Secure Hash Algorithm-1 (SHA-1).

15. The method of claim 12, wherein said hash comprises a Message Digest-5 (MD-5) algorithm.

16. The method of claim 12, wherein said first output comprises at least 128 bits of binary data.

17. The method of claim 16, wherein said key comprises a first 128 bits of said first output.

18. The method of claim 12, wherein said second output comprises at least 128 bits of binary data.

19. The method of claim 18, wherein said counter vatiable comprises a set of 64 bits of said second output.

20. The method of claim 19, wherein said counter variable comprises each of bits 65 through 128 of said second output.

21. The method of claim 12, further comprising:
determining a seed value based on a second portion of said second output.

22. The method of claim 21, wherein said second output comprises at least 128 bits of binary data.

23. The method of claim 22, wherein said seed value comprises a set of 64 bits of said second output.

24. The method of claim 22, wherein said seed value comprises each of bits 1 through 64 of said second output.

25. The method of claim 12, further comprising:
storing each of the key, the counter variable and the seed value in the output buffer.

26. The method of claim 25, further comprising:
receiving a second input seed;
clearing the output buffer, after said receiving the second input seed;
determining a second key, a second counter variable and a second seed value, based on said second input seed; and
storing the second key, the second counter variable and the second seed value in the output buffer after said clearing.

27. The method of claim 26, wherein said determining the second key comprises:
concatenating the first constant, the key, the seed value, the counter variable, and the second input seed;
generating a third output based on a hash of the concatenated first constant, the key, the seed value, the counter variable and the second input seed; and
generating the second key based on at least a portion of the third output.

28. The method of claim 27, wherein said generating the second counter variable comprises:
concatenating the second constant, the key, the seed value, the counter variable, and the second input seed;
generating a fourth output based on a hash of the concatenated first constant, the key, the seed value, the counter variable and the second input seed; and
generating the second counter variable based on a portion of the fourth output.

29. The method of claim 28, further comprising:
generating the second seed value based on a portion of the fourth output.

30. The method of claim 29, further comprising:
generating a random number based on the second key, the second counter variable and the second seed value.

31. The method of claim 30, wherein said generating the random number comprises:
encrypting said second counter variable using the second key and a block cipher to generate an encrypted result;
performing an exclusive-or operation of the encrypted result with the first seed value to generate a second encrypted result; and
encrypting the second encrypted result using the second key and the block cipher to determine the random number.

32. The method of claim 31, further comprising:
determining a third counter variable by summing the second counter variable with a third constant.

33. The method of claim 32, wherein said third constant comprises a 64-bit odd constant.

34. The method of claim 33, wherein said summing comprises addition of the second counter variable and the third constant in little endian fashion modulo $2^{64}$.

35. The method of claim 33, further comprising: determining a third seed value including:
encrypting said second counter variable based on said second key using a block cipher to generate a third encrypted result;
performing an exclusive-or operation of the third encrypted result with the random number to generate a fourth encrypted result;
encrypting said fourth encrypted result based on the second key and the block cipher to determine the third seed value.

36. The method of claim 12, further comprising:
encrypting said counter variable based on said key to determine a random number.

37. The method of claim 36, wherein said encrypting comprises:
encrypting said counter variable using the key and a block cipher to generate an encrypted result; and
encrypting the encrypted result using the key and the block cipher to generate the random number.

38. A mobile terminal comprising instructions for performing the method of claim 12.

39. A computer-readable medium encoded with processing instructions, executable in a computer system, for
implementing a method for seeding a pseudo-random number generator (PRNG) in an initial
state for securely generating a random number, the method comprising:
receiving an input seed;
concatenating the input seed with a first constant;
determining a first output based on a hash of the concatenated input seed and the first constant;
concatenating the input seed with a second constant;
determining a second output based on a hash of the concatenated input seed and the second constant;
determining a key based on at least a portion of the first output, the key for determining a random number;
determining a counter variable based on a portion of the second output, the counter variable for determining a random number; and
storing the key and the counter variable in an output buffer.

40. An apparatus for seeding a pseudo-random number generator (PRNG) in an initial state for securely generating a random number, comprising:
means for receiving an input seed;
means for concatenating the input seed with a first constant;
means for determining a first output based on a hash of the concatenated input seed and the first constant;
means for concatenating the input seed with a second constant;
means for determining a second output based on a hash of the concatenated input seed and the second constant;
means for determining a key based on at least a portion of the first output, the key for determining a random number;
means for determining a counter variable based on a portion of the second output, the counter variable for determining a random number; and
means for storing the key and the counter variable in an output buffer.

41. An apparatus for seeding a pseudo-random number generator (PRNG) in an initial
state for securely generating a random number, comprising:
a processor; and a memory in communication with the processor, the memory for storing a plurality of processing instructions enabling the processor to:
receive an input seed;
concatenate the input seed with a first constant;
determine a first output based on a hash of the concatenated input seed and the first constant;
concatenate the input seed with a second constant;
determine a second output based on a hash of the concatenated input seed and the second constant;
determine a key based on at least a portion of the first output, the key for determining a random number;
determine a counter variable based on a portion of the second output, the counter variable for determining a random number; and
store the key and the counter variable in an output buffer.

42. A method for generating state variables for a pseudo-random number generator (PRNG) after an initial state for securely generating a random number, comprising:
storing first state variables including a first key, a first seed value and a first counter variable based on a hash output in an output buffer;
receiving an input seed;
clearing the buffer storing the previous output based on said receiving; and
determining second state variables including a second key, a second seed value, and a second counter variable, based upon the first state variables and the input seed, after said clearing, wherein said determining second state variables comprises:
concatenating a first constant, the first key, the first seed value, the first counter variable and the input seed to determine a first result;
performing a hash of the first result to determine a first output value;
concatenating a second constant, the first key, the first seed value, the first counter variable and the input seed to determine a second result;
performing a hash of the second result to determine a second output value;
determining a second key based on the first output value;
determining a second seed value based on at least a first portion of the second output value; and
determining a second counter variable based on at least a second portion of the second output value.

43. The method of claim 42, further comprising storing the second output in the output buffer.

44. The method of claim 42, further comprising:
generating a random number based on the first seed value, the second key and the second counter variable.

45. The method of claim 44, wherein said generating further comprises:
encrypting said second counter variable using the second key and a block cipher to generate an encrypted result;
performing an exclusive-or operation of the encrypted result with the first seed value to generate a second encrypted result; and
encrypting the second encrypted result using the second key and the block cipher to generate the random number.

46. The method of claim 45, further comprising:
determining third state variables prior to receiving a second input seed, including:
determining a third counter variable by summing the second counter variable with a timestamp constant; and determining a third seed value, comprising:
encrypting said second counter variable using the second key and a block cipher to generate a third encrypted result;
performing an exclusive-or operation of the third encrypted result with the random number to determine a fourth encrypted result; and
encrypting the fourth encrypted result using the second key and the block cipher to determine the third seed value for determining a subsequent random number.

47. The method of claim 46, further comprising:
generating a second random number based on the second seed value, the second key and the third counter variable.

48. The method of claim 47, wherein said generating the second random number further comprises:
encrypting said third counter variable using the second key and a block cipher to generate a third encrypted result;
performing an exclusive-or operation of the encrypted result with the second seed value to generate a fourth encrypted result; and
encrypting the fourth encrypted result using the second key and the block cipher to generate the second random number.

49. The method of claim 42, wherein said hash comprises at least one of: a Secure Hash Algorithm-1 (SHA-1) and a Message Digest-5 (MD-5) algorithm.

50. The method of claim 42, wherein the input seed comprises an arbitrary byte array received from an entropy source.

51. A mobile terminal comprising instructions for performing the method of claim 42.

52. A method for determining a random number using a pseudo-random number generator (PRNG) in an initial state, comprising:
storing state variables in an output buffer, the state variables including a first key, a first seed value, and a first counter variable based on a hash output;
determining a second counter variable by summing the first counter variable with a constant;
encrypting said second counter variable using the first key and a block cipher to generate a first encrypted result;
performing an exclusive-or operation of the first encrypted result with the first seed value to generate a second encrypted result; and
encrypting the second encrypted result using the first key and the block cipher to generate a random number.

53. The method of claim 52, wherein said summing comprises adding the first counters variable and the constant in little endian fashion modulo $2^{64}$.

54. A computer-readable medium encoded with processing instructions, executable in a computer for implementing a method for determining a random number using a pseudo-random number generator (PRNG) in an initial state, the method comprising:
storing state variables in an output buffer, the state variables including a first key, a first seed value, and a first counter variable;
determining a second counter variable by summing the first counter variable with a constant;
encrypting said second counter variable using the first key and a block cipher to generate a first encrypted result;
performing an exclusive-or operation of the first encrypted result with the first seed value to generate a second encrypted result; and
encrypting the second encrypted result using the first key and the block cipher to generate a random number.

55. An apparatus for determining a random number using a pseudo-random number generator (PRLNG) in an initial state, comprising:
means for storing state variables in an output buffer, the state variables including a first key, a first seed value, and a first counter variable based upon a hash value;
means for determining a second counter variable by summing the first counter variable with a constant;
means for encrypting said second counter variable using the first key and a block cipher to generate a first encrypted result;
means for performing an exclusive-or operation of the first encrypted result with the first seed value to generate a second encrypted result; and
means for encrypting the second encrypted result using the first key and the block cipher to generate a random number.

56. A mobile terminal comprising instructions for performing the method of claim 54.

57. An apparatus for determining a random number using a pseudo-random number generator (PRNG) in an initial state, comprising:
a processor; and
a memory in communication with the processor, the memory for storing a plurality of processing instructions enabling the processor to:
store state variables for a PRNG in an output buffer, the state variables including a first key, a first seed value, and a first counter variable based upon a hash value;
determine a second counter variable by summing the first counter variable with a constant;
encrypt said second counter variable using the first key and a block cipher to generate a first encrypted result;
perform an exclusive-or operation of the first encrypted result with the first seed value to generate a second encrypted result; and
encrypt the second encrypted result using the first key and the block cipher to generate a random number.

58. A method for generating a random number, comprising:
storing a key and a counter variable in an output buffer, wherein the counter variable is based on a hash output and is not a timestamp variable;
generating a random number based on at least the key and the counter variable, wherein said generating further comprises:
receiving an input seed, prior to said storing;
determining the key value and the counter variable, prior to said storing, including;
concatenating the input seed with a first constant;
determining a first output based on a hash of the concatenated input seed and the first constant;
concatenating the input seed with a second constant;
determining a second output based on a hash of the concatenated input seed and the second constant;
determining the key based on at least a portion of the first output, the key for generating the random number; and
determining the counter variable based on a portion of the second output, the counter variable for generating the random number.

59. The method of claim 58, further comprising:
determining a seed value based on the key, the random number and the counter variable;
determining a second counter variable based on summing the first variable and a constant; and generating a second random number based on at least the key, the second counter variable and the seed value.

60. The method of claim 59, wherein said generating a second random number further comprises:
encrypting said second counter variable using the key and a block cipher to generate a first encrypted result;
performing an exclusive-or operation of the first encrypted result with the seed value to generate a second encrypted result; and
encrypting the second encrypted result using the key and the block cipher to generate the second random number.

61. The method of claim 58, further comprising:
receiving a new input seed, after said generating; and
determining new state variable for use by the PRNG in generating subsequent random numbers.

62. A mobile terminal comprising instructions for performing the method of claim 58.

63. A method for determining a sequential output of random numbers using a pseudo-random number generator in an initial state, comprising:
storing initial state variables in an output buffer, the initial state variables including a first key, a first seed value, and a first counter variable based upon a hash output;
determining a second counter variable by summing the first counter variable with a constant;
encrypting said second counter variable using the first key and a block cipher to generate a first encrypted result;
performing an exclusive-or operation of the first encrypted result with the first seed value to generate a second encrypted result;
encrypting the second encrypted result using the first key and the block cipher to generate a random number;
determining a second seed value including:
encrypting said second counter variable using the key and the block cipher to generate a third encrypted result;
performing an exclusive-or operation of the third encrypted result with the random number to determine a fourth encrypted result; and
encrypting the fourth encrypted result using the key and the block cipher to determine the second seed value for generating a subsequent random number;
determining a third counter variable by summing the second counter variable with the constant;
encrypting said third counter variable using the key and the block cipher to generate a fifth encrypted result;
performing an exclusive-or operation of the fifth encrypted result with the second seed value to generate a sixth encrypted result; and
encrypting the sixth encrypted result using the first key and the block cipher to generate a second random number.

64. The method of claim 63, wherein said summing comprises adding the first counter variable and the constant in little endian fashion modulo $2^{64}$.

65. A mobile terminal comprising instructions for performing the method of claim 63.

66. A computer-readable medium encoded with processing instructions, executable in a computer for implementing a method for determining a sequential output of random numbers using a pseudo-random number generator in an initial state, the method comprising:
storing initial state variables including an internal key, a seed value and a counter variable based on a hash output in an output buffer, the initial state variables including a first key, a first seed value, and a first counter variable;

determining a second counter variable by summing the first counter variable with a constant;
encrypting said second counter variable using the first key and a block cipher to generate a first encrypted result;
performing an exclusive-or operation of the first encrypted result with the first seed value to generate a second encrypted result;
encrypting the second encrypted result using the first key and the block cipher to generate a random number;
determining a second seed value including:
encrypting said second counter variable using the key and the block cipher to generate a third encrypted result;
performing an exclusive-or operation of the third encrypted result with the random number to determine a fourth encrypted result; and
encrypting the fourth encrypted result using the key and the
block cipher to determine the second seed value for generating a subsequent random number;
determining a third counter variable by summing the second counter variable with the constant;
encrypting said third counter variable using the key and the block cipher to generate a fifth encrypted result;
performing an exclusive-or operation of the fifth encrypted result with the second seed value to generate a sixth encrypted result; and
encrypting the sixth encrypted result using the first key and the block cipher to generate a second random number.

67. An apparatus for determining a sequential output of random numbers using a pseudo-random number generator in an initial state, comprising:
means for storing initial state variables including an internal key, a seed value and a counter variable based on a hash output in an output buffer, the initial state variables including a first key, a first seed value, and a first counter variable;
means for determining a second counter variable by summing the first counter variable with a constant;
means for encrypting said second counter variable using the first key and a block cipher to generate a first encrypted result;
means for performing an exclusive-or operation of the first encrypted result with the first seed value to generate a second encrypted result;
means for encrypting the second encrypted result using the first key and the block cipher to generate a random number;
means for determining a second seed value including:
means for encrypting said second counter variable using the key and the block cipher to generate a third encrypted result;
means for performing an exclusive-or operation of the third encrypted result with the random number to determine a fourth encrypted result; and
means for encrypting the fourth encrypted result using the key and the block cipher to determine the second seed value for generating a subsequent random number;
means for determining a third counter variable by summing the second counter variable with the constant;
means for encrypting said third counter variable using the key and the block cipher to generate a fifth encrypted result;
means for performing an exclusive-or operation of the fifth encrypted result with the second seed Value to generate a sixth encrypted result; and means for encrypting the sixth encrypted result using the first key and the block cipher to generate a second random number.

68. An apparatus for determining a sequential output of random numbers using a pseudo-random number generator in an initial state, comprising:
  a processor; and
  a memory in communication with the processor, the memory for storing a plurality of processing instructions for enabling the processor to:
  store initial state variables including an internal key, a seed value and a counter variable based on a hash output in an output buffer, the initial state variables including a first key, a first seed value, and a first counter variable;
  determine a second counter variable by summing the first counter variable with a constant;
  encrypt said second counter variable using the first key and a block cipher to generate a first encrypted result;
  perform an exclusive-or operation of the first encrypted result with the first seed value to generate a second encrypted result;
  encrypt the second encrypted result using the first key and the block cipher to generate a random number;
  determine a second seed value including:
  encrypt said second counter variable using the key and the block cipher to generate a third encrypted result;
  perform an exclusive-or operation of the third encrypted result with the random number to determine a fourth encrypted result; and
  encrypt the fourth encrypted result using the key and the block cipher to determine the second seed value for generating a subsequent random number;
  determine a third counter variable by summing the second counter variable with the constant;
  encrypt said third counter variable using the key and the block cipher to generate a fifth encrypted result;
  perform an exclusive-or operation of the fifth encrypted result with the second seed value to generate a sixth encrypted result; and
  encrypt the sixth encrypted result using the first key and the block cipher to generate a second random number.

* * * * *